June 14, 1955  V. W. PETERSON ET AL  2,710,595
FLUID OPERATED CYLINDER WITH ADJUSTABLE CUSHION
Filed June 16, 1952  2 Sheets-Sheet 1
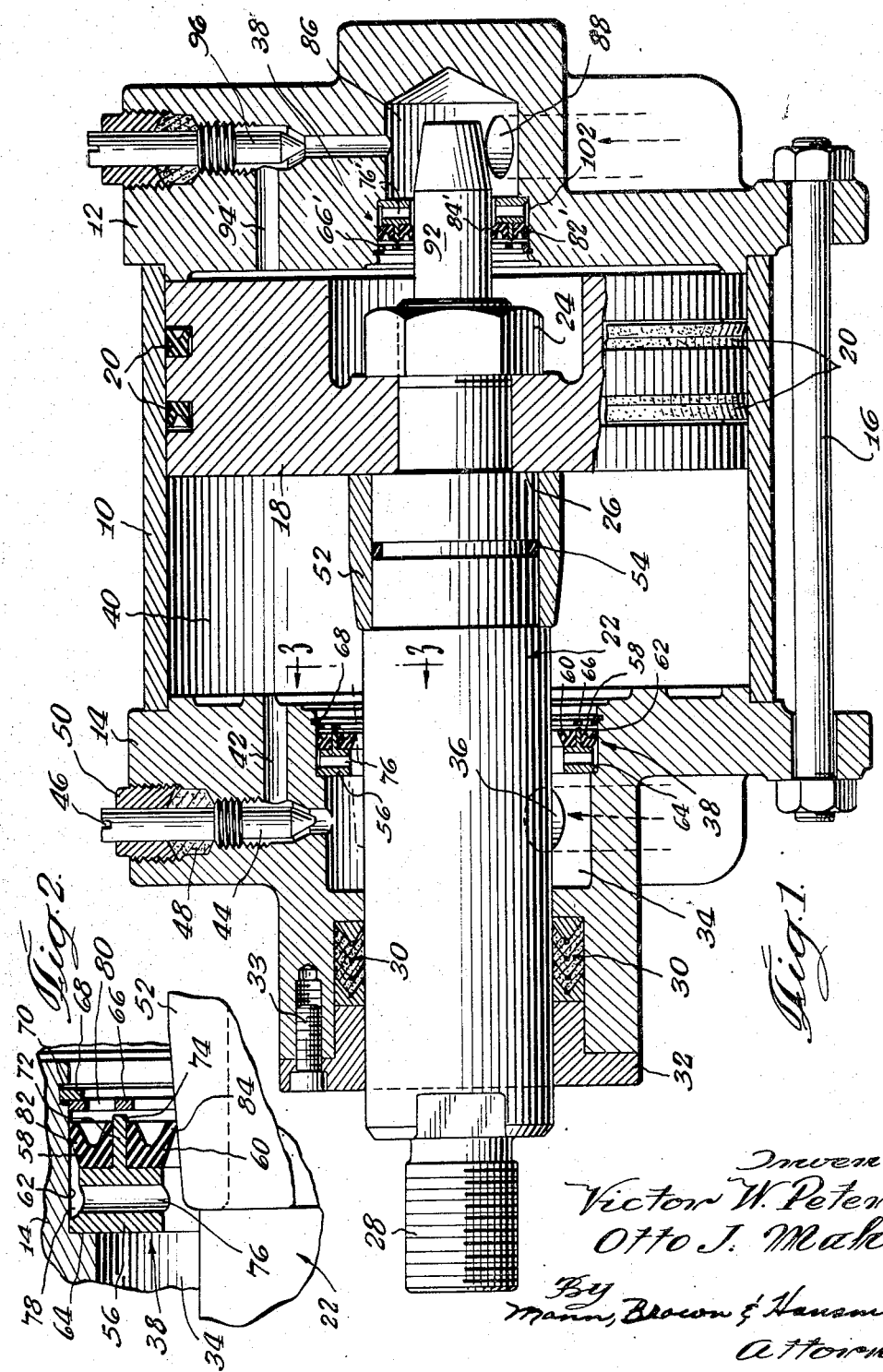

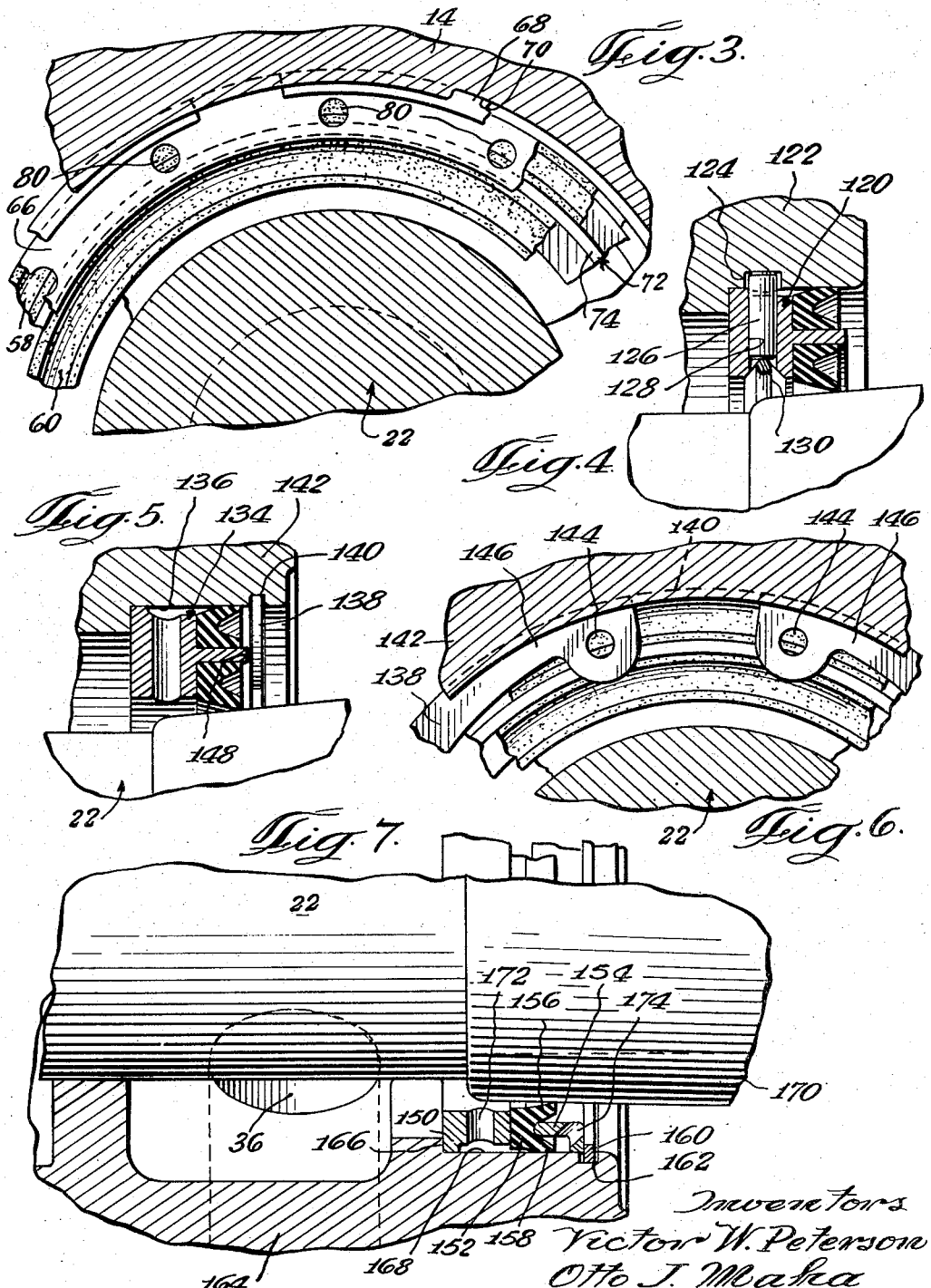

2,710,595

FLUID OPERATED CYLINDER WITH ADJUSTABLE CUSHION

Victor W. Peterson, La Porte, Ind., and Otto J. Maha, Chicago, Ill., assignors to Hannifin Corporation, Chicago, Ill., a corporation of Illinois Application June 16, 1952, Serial No. 293,786

5 Claims. (Cl. 121—38)

Our invention relates to fluid operated cylinders with adjustable cushions and is applicable both to pneumatic and hydraulic cylinders.

Fluid operated cylinders in which either one or both ends of the cylinder are provided with adjustable cushions are extensively used for a wide variety of industrial purposes. Among the objects of our invention are: to simplify and improve the construction of such cylinders, reduce their cost of manufacture, improve their operation, increase their life, and provide new and improved combined sealing means and check valves for such cylinders.

Other objects and advantages will become apparent as the description proceeds in connection with the accompanying drawings, in which:

Fig. 1 is a longitudinal sectional view through a pneumatic cylinder incorporating our invention;

Fig. 2 is an enlarged sectional view of the combined sealing means and check valve;

Fig. 3 is an enlarged partial transverse section taken on the line 3—3 of Fig. 1;

Fig. 4 is a view similar to Fig. 2 but showing a modification;

Fig. 5 is a view similar to Fig. 2, but showing a further modification;

Fig. 6 is a view similar to Fig. 3, but showing the modification of Fig. 5; and

Fig. 7 is a partial longitudinal sectional view on an enlarged scale showing a fourth embodiment of our invention.

The pneumatic cylinder shown in Fig. 1 of the drawings is a double-acting cylinder having an adjustable air cushion at each end. This cylinder comprises a body 10 having caps 12 and 14 secured thereto by the tie rods 16. A piston 18 is located in the body 10 and may be provided with suitable packing 20.

The piston 18 is attached to a piston rod 22 by means of a nut 24 which clamps the central portion of the piston against a shoulder 26 provided by the piston rod. The piston rod extends through the cap 14 and has a threaded end 28 which may be attached to any mechanism to be operated by the cylinder. The gland packing 30 effects a seal between the piston rod 22 and cap 14 and is held in place by a packing gland 32 attached by screws 33 to the cap 14.

The cap 14 is provided with a chamber 34 surrounding a portion of the piston rod 22 and having a combined inlet and outlet port 36. A combined sealing means and check valve is indicated generally by reference character 38, and is located between the chamber 34 and the cylinder bore 40. When the piston and piston rod are in the position shown in Fig. 1 there is free communication between the chamber 34 and adjacent end of the cylinder bore by way of the annular space between the piston rod and valve 38.

A bypass 42 also connects the chamber 34 with the adjacent end of the cylinder bore 40. The effective cross-section of this bypass may be varied by a needle or metering valve 44 threaded into the cap 14 and having a kerf 46 for receiving a screwdriver or similar tool. A packing 48 forms a seal between the needle valve 44 and cap 14 and this packing is compressed by a tubular nut 50.

When the piston 18 has moved a substantial distance toward the left as viewed in Fig. 1, the cushion sleeve 52 engages and forms a seal with the combined sealing means and check valve 38. This is indicated by the dotted lines in Fig. 1 showing different positions of this sleeve, and is shown more clearly in the enlarged view of Fig. 2. An O-ring 54 of natural or synthetic rubber, or other suitable material, is provided to prevent leakage of air axially of the cylinder between the cushion sleeve 52 and the adjacent portion of the piston rod.

Referring particularly to Fig. 2, it will be seen that the combined sealing means and check valve 38 includes a collar 56 of metal or other suitable material and a pair of sealing rings 58 and 60 of homogeneous synthetic rubber structure or other suitable material bonded to the collar 56 to form a unitary structure therewith.

The combined sealing means and check valve is located in a counterbore 62 with which it forms a sliding fit. Movement in one direction is limited by the shoulder 64 and in the other direction by a perforated ring 66 held in place by a snap ring 68 engaging a groove 70 in the cap 14. The collar 56 has an integral flange 72 located between the sealing rings 58 and 60 and preferably bonded thereto. This flange has an abutment face 74 located an appreciable distance to the right of the nearest portions of the sealing rings 58 and 60 so that, upon engagement of this surface 74 with the perforated ring 66, the latter is spaced from the sealing rings 58 and 60.

The collar 56 is provided with a plurality of radial passages 76 providing free communication between the chamber 34 and the annular space 78 surrounding the collar. Referring particularly to Fig. 3 it will be seen that the perforated ring 66 has a plurality of perforations 80, and these perforations are so positioned that they are not covered by the snap ring 68.

When the parts are in the position shown in either Fig. 1 or Fig. 2, the outer lip 82 of the sealing ring 58 lightly engages the wall of the counterbore 62. The flexibility of this lip compensates for slight variations in dimensions of the sealing ring itself, the counterbore 62, and any slight eccentricity of the collar 56 therein so that it is not essential to make any of these parts to a high degree of dimensional accuracy. When the piston is moved to the left, as viewed in Fig. 2, the collar 52 engages the inner lip 84 of sealing ring 60 and here again the flexibility of this lip compensates for slight differences in size and centering of the collar relative to the sealing ring.

The cap 12 is also provided with a chamber 86 having a combined inlet and exhaust port 88. A combined sealing means and check valve 38' is interposed between the chamber 86 and the adjacent end of the cylinder bore 40. This sealing means and check valve 38' is illustrated as being identical except for size with the sealing means and check valve 38. In the position of the parts shown in Fig. 1, the piston rod extension or spear 92 engages the inner lip of the inner sealing ring of the combined sealing means and check valve 38' and prevents flow of fluid from the adjacent end of the cylinder bore into chamber 86.

A bypass 94 connects the chamber 86 with the adjacent end of the cylinder bore 40 and this bypass has a needle valve 96 which may be adjusted to give any desired metered flow through the bypass. While it is common and generally desirable to provide the bypasses 42 and 94 with adjustable needle valves, this is not essential to our invention and fixed bypasses may be used in lieu of the adjustable bypasses shown.

It will be understood that admission and discharge of air or other fluid through the ports 36 and 88 is controlled by suitable valve means (not shown) whereby these ports may be alternately connected with a source of fluid under pressure. Such valve means may be operated either manually or by power, and by either direct or remote control, as desired, and forms no part of our present invention.

With the parts in the position shown in Fig. 1, the control valve is operated to connect port 88 with a source of fluid under pressure, and to connect port 36 with atmosphere or a chamber into which the operating fluid may be discharged. Fluid entering port 88 fills chamber 86 and a small amount of this fluid flows through bypass 94 into the right-hand end of cylinder bore 40. The small amount of fluid flowing through bypass 94, however, is insufficient to give a quick action to the piston 18. The great bulk of the fluid entering chamber 86 flows past the combined sealing means and check valve 38' and into the right-hand end of the cylinder bore. In so doing the fluid presses inwardly the outer lip 82' of the outer sealing ring and the inner lip 84' of the inner sealing ring. These lips are normally in light sealing engagement with the counterbore 102 and the spear 92 respectively and yield readily to permit free flow of fluid therepast. Approximately half of the air flowing past the combined sealing means and check valve 38' flows through the radial passages 76', past inner lip 84', and through the perforations in the perforated ring 66'.

This free flow of fluid into the right-hand end of the cylinder bore results in immediate movement of the piston 18 toward the left, as viewed in Fig. 1. During the first part of this piston movement, the fluid in the cylinder bore to the left of the piston can flow freely between the piston rod 22 and combined sealing means and check valve 38 to the exhaust port 36. This condition prevails until the collar 52 engages the inner lip 84 of the sealing means, as shown in Fig. 2. This traps the remaining fluid in the left-hand end of the cylinder bore and the only escape for such fluid is by way of the bypass 42, which is adjusted to give the desired cushioning effect.

This same leftward movement of the piston 18 causes the spear 92 to move out of the combined sealing means and check valve 38'. This establishes wide open communication between the chamber 86 and right-hand end of the cylinder bore whereupon lips 82' and 84' of the inner and outer sealing rings respectively return to their normal positions.

On the return stroke of the piston, fluid entering chamber 34 from inlet port 36 forces inwardly the outer lip 82 of the outer sealing ring 58 and forces outwardly the inner lip 84 of the inner sealing ring 60 to flow freely into the left-hand end of the cylinder and initiate instantly a return movement of the piston 18. Again, a slight amount of fluid enters the left-hand end of the cylinder bore 40 through bypass 42. We have found it advisable to give the passages 76 in the collar 56 a total area equal to at least half of the total area of the port 36. The perforations 80 are likewise of such size and number as to have a total area at least half the area of the port 36. The corresponding passages and perforations of the combined sealing means and check valve 38' are also made of this same size.

In Fig. 4 we have illustrated a different manner of securing the combined sealing means and check valve 120 in its cylinder cap 122. In this form of our invention the cylinder cap is provided with an annular groove 124 for receiving the ends of pins 126 located in certain of the bores or passages 128 of the collar of the combined sealing means and check valve. A snap ring 130 holds the pins 126 in extended position to lock the combined sealing means and check valve in its cap 122.

We have found that two pins 126 located diametrically opposite each other are sufficient to lock the combined sealing means and check valve in its cap 122. In this construction the bores or passages 128 should preferably be of sufficient number and size so that when two of these bores are closed by pins 126, the remainder have a total cross-section equal to at least half of the cross-section of the inlet port.

In the modification of Figs. 5 and 6 the combined sealing means and check valve 134 is secured in its counterbore 136 by a commercial snap ring 138 engaged in a groove 140 in the cap 142. As best shown in Fig. 6, the snap ring 138 has perforations 144 and portions 146 of reduced diametral thickness to permit free bypassing of fluid even when the abutment face 148 engages the snap ring.

In the modification of Fig. 7 the combined sealing means and check valve comprise a spacing collar 150 and a single sealing ring 152 not necessarily bonded to the collar 150. A spacer ring 154 engages the sealing ring 152 between the lips 156 and 158 in such manner that fluid has free access to space between the spacer ring 154 and the adjacent walls of these lips. A snap ring 160 engages a groove 162 in the cap 164 and cooperates with the shoulder 166 to hold the assembly in the counterbore 168.

In this construction the inner lip 156 is adapted to engage the cushion sleeve 170 or a spear-like extension of the piston rod, and the outer lip 158 engages the wall of the counterbore 168. These lips are adapted to be moved toward each other by fluid pressure so that fluid can flow from left to right between lip 156 and collar 170 and also between lip 158 and the wall of counterbore 168. The collar 150 is provided with passages 172 and spacer ring 154 is provided with passages 174, to permit this latter flow.

In all embodiments of our invention the combined sealing means and check valve is so designed and arranged in the cylinder structure that the flexible sealing means compensates for slight variations in size of the parts and slight variations in eccentricity of one part with respect to another. This materially decreases the cost of manufacture by eliminating the need for close and expensive tolerances in making the individual parts. This construction also compensates for wear and thereby increases the useful life of the cylinder structure and reduces servicing requirements. Furthermore, two separate and distinct passages are provided past the combined sealing means and check valve whereby fluid entering through the inlet port may flow freely into the adjacent end of the cylinder bore with resulting prompt and fast movement of the piston in the desired direction.

Also, the flexible lip of the combined sealing means and check valve coacts either with the cushion collar on the piston rod or the spear-like extension thereof to give an immediate cutting off of direct communication between the adjacent end of the cylinder bore and its discharge port regardless of whether the fluid used is gas or liquid. Thereafter, the sole communication between such end of the cylinder bore and its discharge port is by way of the needle valve controlled bypass which may be accurately adjusted to give the desired cushioning effect. The accuracy of this cushioning adjustment is enhanced by virtue of the fact that the particular sealing means utilized in the combined sealing means and check valve is not affected by small particles of dirt or other impurities in the operating fluid.

In cushioned cylinders it is usual to provide each end of the cylinder with a second bypass having a check valve opening toward the cylinder bore to permit rapid ingress of fluid to such bore. Another advantage of our invention is the elimination of such bypass while retaining all of the benefits thereof.

While we have shown several embodiments of our invention, it is to be understood that our invention is not limited to the details shown and described but may assume numerous other forms and includes all modifications, variations and equivalents coming within the scope of the appended claims.

We claim:

1. A fluid operated cylinder having a cylinder bore, means providing a chamber communicating with said cylinder bore, inlet and outlet port means for said chamber, a piston reciprocable in said cylinder bore, a combined sealing means and check valve between said cylinder bore and chamber, a part movable with said piston and cooperable with said combined sealing means and check valve to cut off flow of fluid from said cylinder bore to said chamber, said combined sealing means and check valve including a perforated collar carrying inner and outer flexible annular sealing surfaces engageable respectively with said part and a wall of said chamber, said sealing surfaces yieldable under fluid pressure to provide two separate passages for fluid flow from said chamber to said cylinder bore, means extending through perforations in said collar for securing the combined sealing means and check valve to said cylinder, and a restricted bypass around said combined sealing means and check valve connecting said cylinder bore and chamber.

2. In a fluid operated cylinder of the class described, the combination of a body providing a cylinder bore, caps secured to opposite ends of said body, said caps providing chambers communicating with opposite ends of said cylinder bore, a combined inlet and outlet port for each chamber, a piston reciprocable in said cylinder bore, a piston rod extending through one of said caps and having an enlargement, a spear extending from the other side of said piston, means interposed between one of said chambers and said cylinder bore and cooperable with said enlargement to cut off fluid flow from the cylinder bore to its chamber, means cooperable with said spear for cutting off fluid flow from said cylinder bore to the other chamber, each of said last-named means comprising a rigid collar, a pair of flexible sealing rings attached to said collar, and a part between said rings and extending therebeyond to terminate in an abutment surface, perforated retaining means adapted to be engaged by said abutment surface, said collar and said perforated retaining means having passages therethrough, the passages in each such part having a total area approximately equal to one-half the area of one of said ports, said sealing rings being yieldable under fluid pressure to permit flow of fluid from its chamber to said cylinder bore, a bypass connecting each chamber with said cylinder bore, and a metering valve for each bypass.

3. In a fluid operated cylinder of the class described, the combination of a body providing a cylinder bore, caps secured to opposite ends of said body, said caps providing chambers communicating with opposite ends of said cylinder bore, a combined inlet and outlet port for each chamber, a piston reciprocable in said cylinder bore, a piston rod extending through one of said caps and having an enlargement, a spear extending from the other side of said piston, means interposed between one of said chambers and said cylinder bore and cooperable with said enlargement to cut off fluid flow from the cylinder bore to its chamber, means cooperable with said spear for cutting off fluid flow from said cylinder bore to the other chamber, each of said last-named means comprising a metal collar, a pair of flexible sealing rings attached to said collar, and a part between said rings and extending therebeyond to terminate in an abutment surface, retaining means adapted to be engaged by said abutment surface, said collar having passages therethrough having a total area approximately equal to one-half the area of one of said ports, said sealing rings being yieldable under fluid pressure to permit flow of fluid from its chamber to said cylinder bore, and a bypass connecting each chamber with said cylinder bore.

4. In a fluid operated cylinder of the class described, the combination of a body providing a cylinder bore, caps secured to opposite ends of said body, said caps providing chambers communicating with opposite ends of said cylinder bore, a combined inlet and outlet port for each chamber, a piston reciprocable in said cylinder bore, a piston rod extending through one of said caps and having an enlargement, a spear extending from the other side of said piston, means interposed between one of said chambers and said cylinder bore and cooperable with said enlargement to cut off fluid flow from the cylinder bore to its chamber, means cooperable with said spear for cutting off fluid flow from said cylinder bore to its chamber, each of said last-named means comprising a metal collar, a pair of flexible sealing lips attached to said collar, and a spacer ring between said lips and extending therebeyond to terminate in an abutment surface, retaining means adapted to be engaged by said abutment surface, said collar and said spacer ring each having passages therethrough, the passages in each such part having a total area approximately equal to one-half the area of one of said ports, said sealing lips being yieldable under fluid pressure to permit flow of fluid from its chamber to said cylinder bore, a bypass connecting each chamber with said cylinder bore, and a metering valve for each bypass.

5. In a fluid operated cylinder of the class described, the combination of a body providing a cylinder bore, caps secured to opposite ends of said body, said caps providing chambers communicating with opposite ends of said cylinder bore, inlet and outlet port means for each chamber, a counterbore between each chamber and said cylinder bore, a piston reciprocable in said cylinder bore, a piston rod extending through one of said caps and having an enlargement, a spear extending from the other side of said piston, means slideably mounted in one of said counterbores and cooperable with said enlargement to cut off fluid flow from the cylinder bore to its chamber, means slideably mounted in the other counterbore and cooperable with said spear for cutting off fluid flow from said cylinder bore to its chamber, each of said last-named means comprising a metal collar, a pair of flexible sealing lips attached to said collar, and a part between said lips and extending therebeyond to terminate in an abutment surface, and retaining means adapted to be engaged by said abutment surface, said collar having passages therethrough having a total area approximately equal to one-half the area of one of said inlet ports, said sealing lips being yieldable under fluid pressure to permit flow of fluid from its chamber to said cylinder bore.

References Cited in the file of this patent

UNITED STATES PATENTS

| | | |
|---|---|---|
| 2,102,834 | Carroll | Dec. 21, 1937 |
| 2,493,602 | Sterrett | Jan. 3, 1950 |

FOREIGN PATENTS

| | | |
|---|---|---|
| 623,478 | Great Britain | May 18, 1949 |
| 635,950 | Great Britain | Apr. 19, 1950 |